United States Patent Office 3,460,204
Patented Aug. 12, 1969

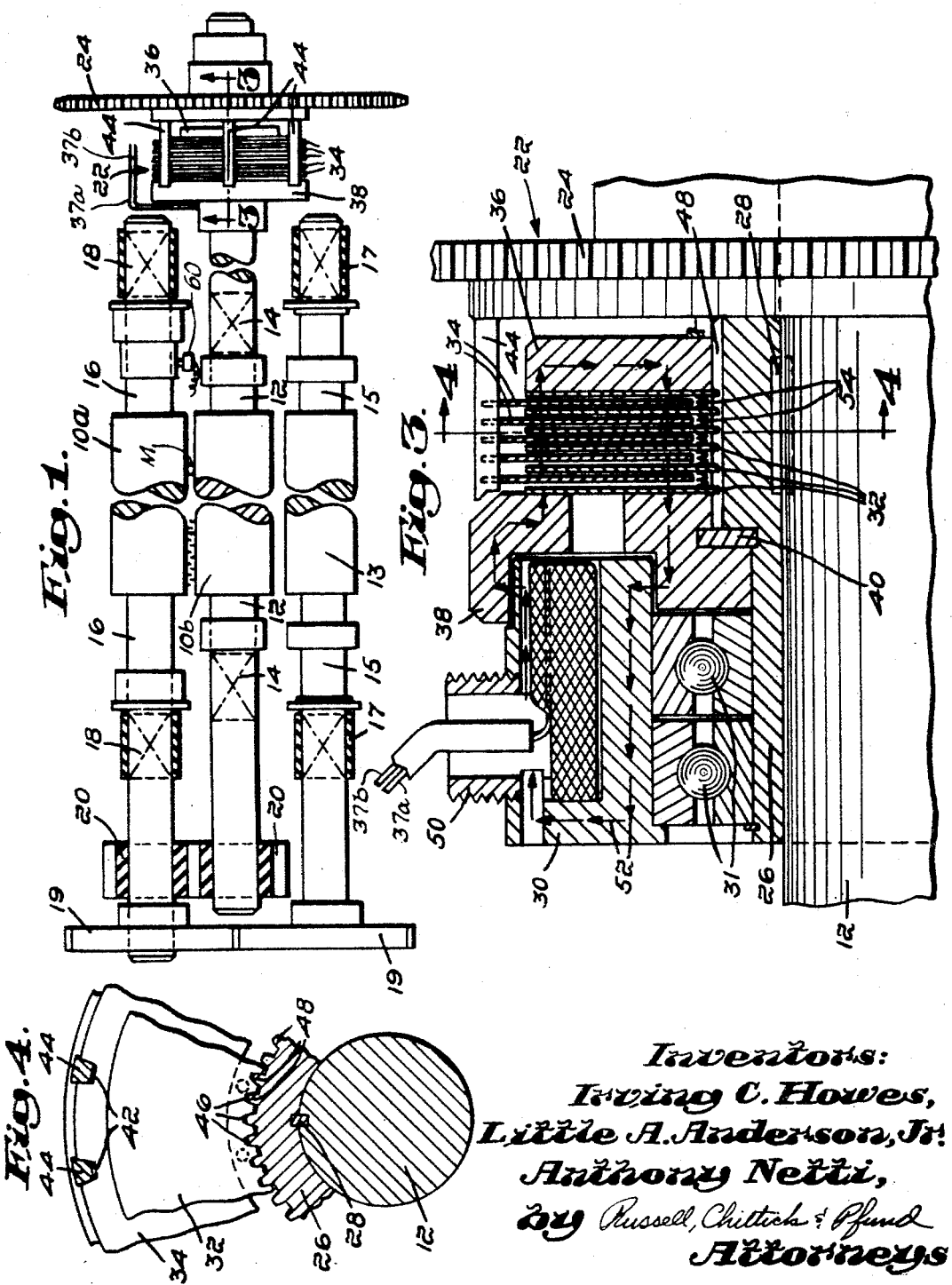

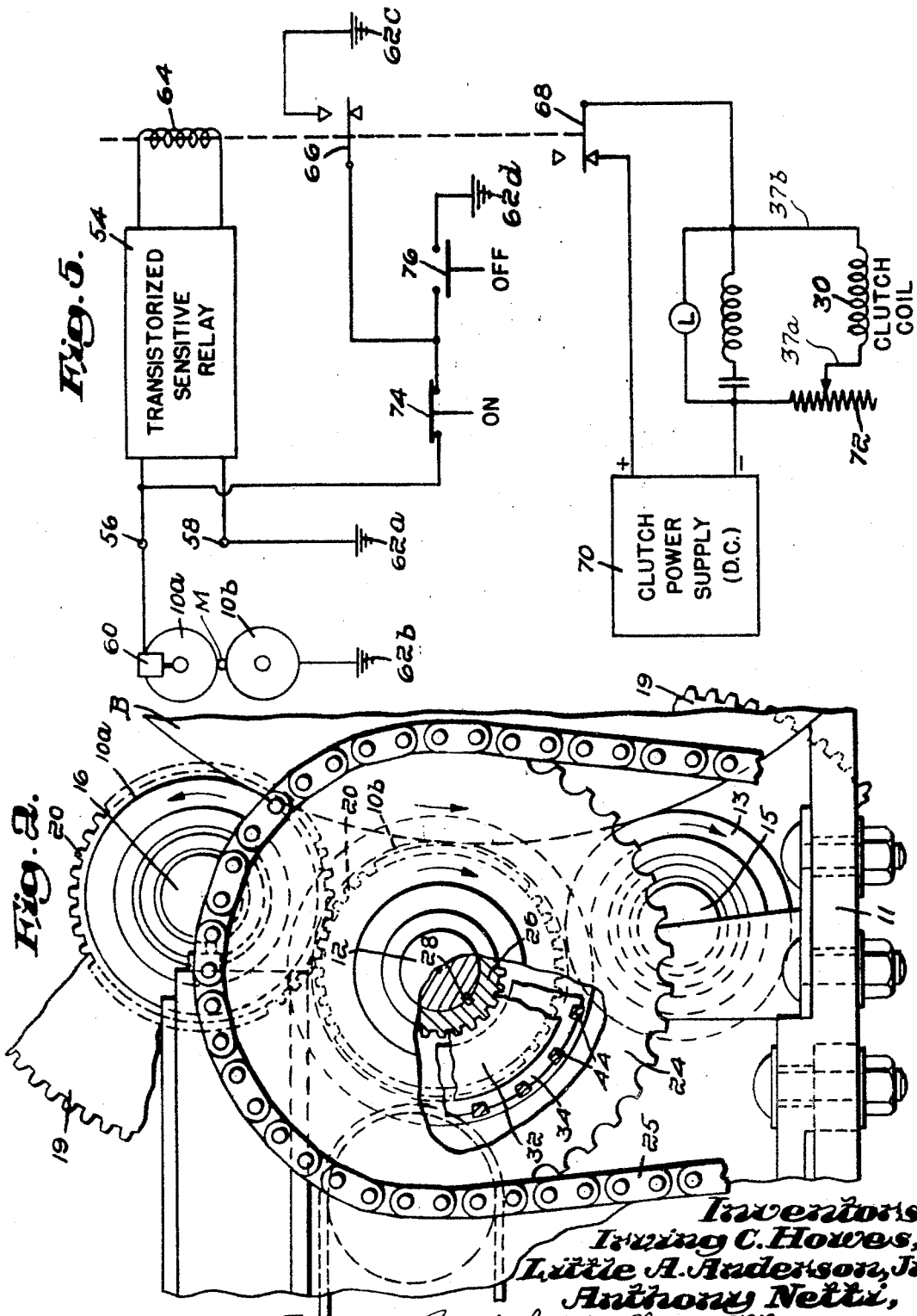

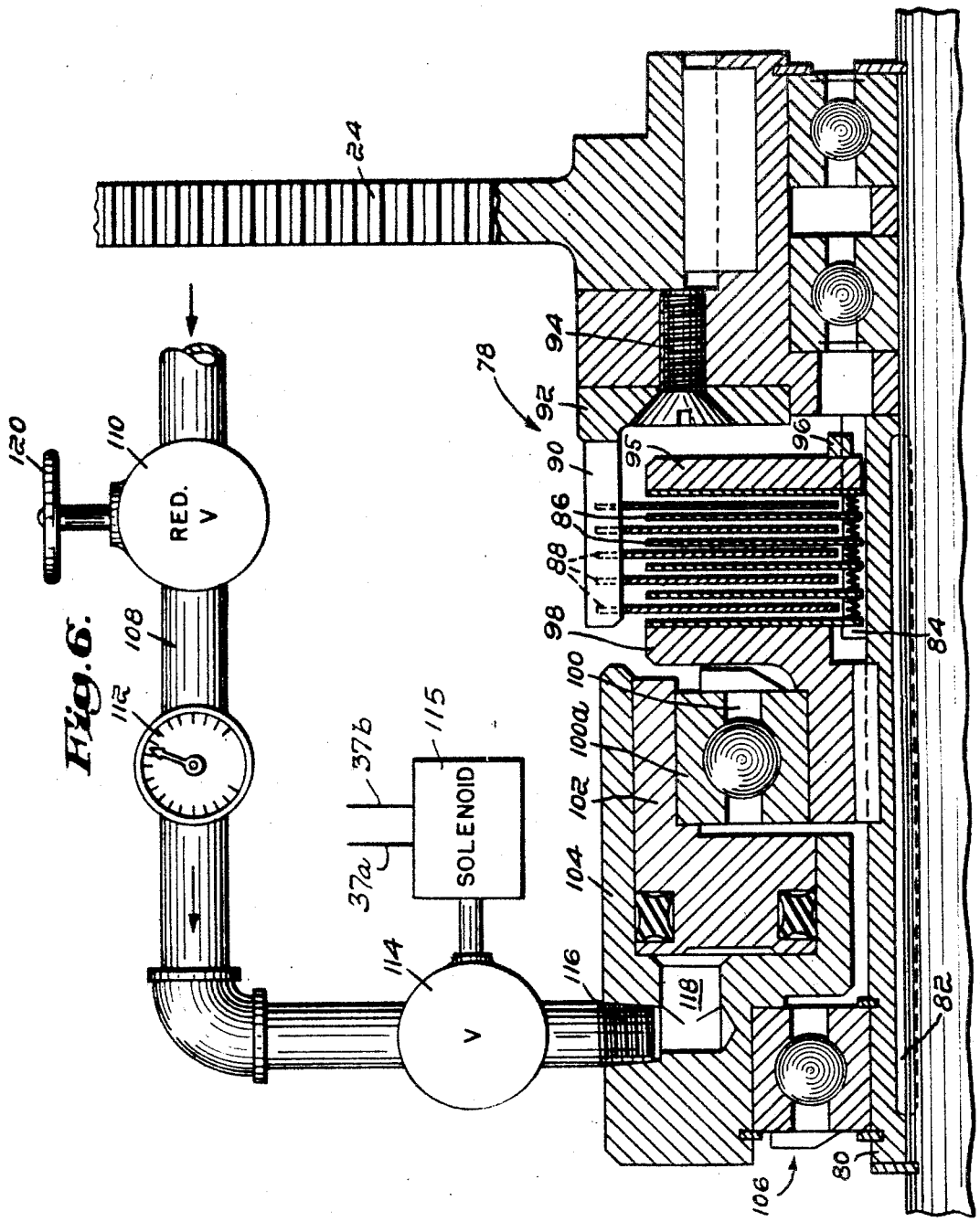

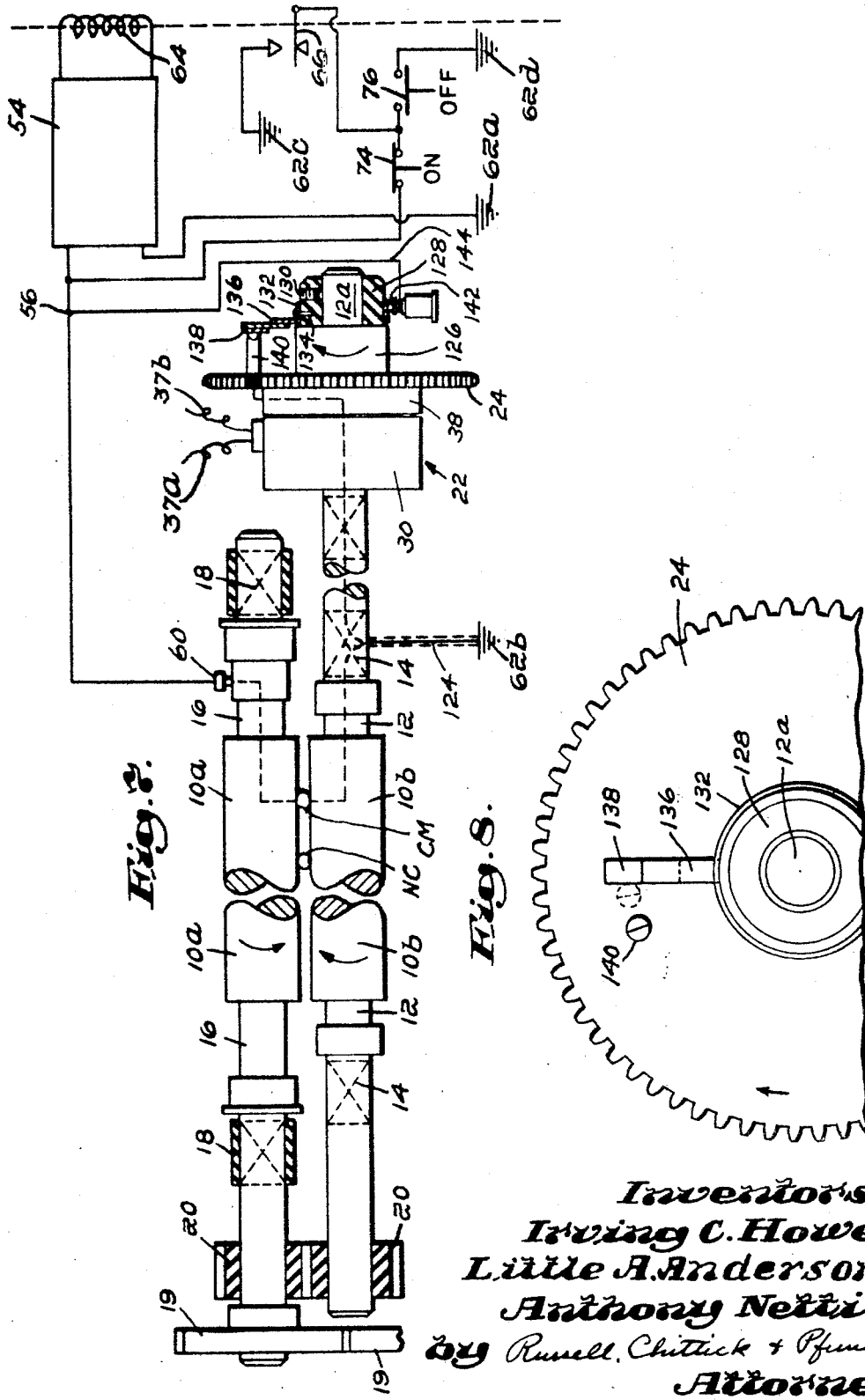

3,460,204
AUTOMATIC ROLL STOP
Irving C. Howes, North Andover, Mass., Little A. Anderson, Jr., Harmony, N.C., and Anthony Netti, Methuen, Mass., assignors to Davis & Furber Machine Company, North Andover, Mass., a corporation of Massachusetts
Continuation-in-part of application Ser. No. 485,232, Sept. 7, 1965. This application Mar. 25, 1968, Ser. No. 717,070
Int. Cl. D01g *31/00, 23/00;* D01b *1/10*
U.S. Cl. 19—.23                         3 Claims

ABSTRACT OF THE DISCLOSURE

This invention relates to the textile machinery industry and more particularly to means for automatically stopping the rotation of feed rolls of a carding machine upon the entry therebetween of foreign material in the form of hard objects capable of damaging the teeth or wire on the rolls. The entry of the object between the rolls causes automatic disengagement of the clutch that drives the rolls. If the object is in the form of an electrical conductor, the clutch will be instantly opened by electrically operated means. If the object is a non-conductor, the clutch is electrically actuated after small angular slippage of the clutch.

Cross reference to related application

This application is a continuation-in-part of the application of Irving C. Howes et al., U.S. Ser. No. 485,232, for Automatic Roll Stop, filed Sept. 7, 1965, now abandoned.

Background of the invention

It is well known that prior to the carding operation, foreign material is sometimes inadvertently intermingled with the fibers. Experience has indicated that this foreign material, which may include small metallic objects as well as relatively hard, bulky non-metallic objects, will on occasion damage the teeth or wire on the feed rolls. Moreover, it has been found that the subsequent carding operation will frequently be adversely affected by the passage of all or some of this foreign material between the feed rolls into the carding machine.

The problem has been recognized in the prior art and various mechanisms have been provided for causing the rolls to stop when foreign matter large enough to damage the teeth or wire of the feed rolls has come therebetween. See, for example, the following U.S. patents: Chapman, No. 195,982 and Merchant, No. 2,102,906. However, these constructions have proved unsatisfactory and have not come into general use even though the problem is substantial.

Summary of the invention

These problems have now been obviated in a novel manner by the present invention, an object of which is to provide a means for preventing the passage of foreign material between cooperative rotating elements, regardless of whether or not the material is electrically conductive.

The result is achieved by the use of an electrically actuated clutch, either of the magnetic flux type or the pneumatic type which provides for slippage when overloaded beyond a predetermined degree and includes adjusting means for varying the load at which slipping occurs. Clutches of the type utilized in the present combination are in themselves old.

The inventive result is achieved by introducing the clutch between a driving gear or pulley (which, while the carding machine is in operation, will normally be rotating continuously at constant speed) and the shaft of one of the two feed rolls. This clutch is controlled by novel electric circuitry which causes instant disengagement of the clutch when a conductive obstruction comes between the feed rolls and substantially instantaneous disengagement when a non-conductive obstruction is encountered. In the latter case, clutch slippage of a few degrees occurs before the electric circuit is closed. The small force required to cause slippage is insufficient to cause damage to the roll teeth or wire.

With the clutch disengaged, the circuitry provides that the feed rolls cannot be restarted after the removal of the obstruction, whether conductive or non-conductive, until a switch has been manually actuated by the operator. This is a feature of importance from a safety standpoint and helps to make the construction commercially acceptable.

Brief description of the drawings

FIG. 1 is a schematic view of a carding machine showing the feed rolls and a portion of the drive system associated therewith;

FIG. 2 is an enlarged schematic end view of FIG. 1 looking from right to left, with portions broken away to better illustrate the cooperative relationship between various drive components;

FIG. 3 is a greatly enlarged sectional view taken along line 3—3 of FIG. 1 and showing the interior of an electrically operated disc-type clutch;

FIG. 4 is a sectional view taken along line 4—4 of FIG. 3;

FIG. 5 is a schematic illustration of the electrical circuit utilized to control the operation of the disc-type clutch shown in FIGS. 2 and 3;

FIG. 6 is a sectional view similar to FIG. 3 of a pneumatically operated disc-type clutch;

FIG. 7 is a schematic view showing a modification in which the clutch is caused to be disengaged by either electrically conductive or non-conductive foreign material; and FIG. 8 is an enlarged section, partially broken away, taken from the right of FIG. 7.

Description of the preferred embodiment

Referring initially to FIGS. 1 and 2 wherein are best illustrated general features of the invention, two feed rolls 10*a* and 10*b* are shown mounted in closely spaced parallel relationship on the frame 11 of a carding machine. Feed roll 10*b* is provided with shaft extension 12 journaled for rotation between bearings 14. In a similar manner, feed roll 10*a* is provided with shaft extensions 16 journaled for rotation between bearings 18. However, it should be noted that unlike bearings 14, bearings 18 are insulated electrically from the carding machine frame 11.

Shaft extensions 12 and 16 are mechanically interconnected at one end by means of a pair of intermeshed dielectric gears 20. Shaft extension 12 is driven at the opposite end through a clutch device 22 by a sprocket 24 and chain 25 leading from the main carding machine drive (not shown). Thus, by virtue of the mechanical interconnection provided between shaft extensions 12 and 16 by gears 20, feed rolls 10*a* and 10*b* are driven in opposite directions as indicated diagrammatically by the arrows in FIG. 2.

In operation, the fibers to be carded are carried to a point adjacent the space between feed rolls 10*a* and 10*b* by any conventional means such as for example, the conveyor A shown in FIG. 2. The fibers are then picked up by the feed rolls and deposited on the lickerin B. at which point the carding operation is begun. It should of course be understood that each feed roll is provided with radially disposed teeth or wire, as for example the type found on conventional card clothing. However, these teeth have been omitted in the present drawings in the interest of clarity and simplification.

A stripper roll 13 having shaft extensions 15 at either end is also mounted between insulated bearings 17 for rotation beneath feed roll 10b in closely spaced parallel relationship thereto. The stripper roll is driven by means of gears 19 connecting one end of shaft extension 15 to the shaft extension 16 of feed roll 10a.

As previously indicated, foreign material is sometimes present in the fibers prior to their presentation to the feed rolls 10a and 10b. Where the foreign material is of a relatively hard and bulky nature, there is danger of damaging the teeth on the feed rolls and subsequent rolls. To obviate this danger, the present invention contemplated driving the feed rolls through a clutch device 22 which is preferably of the disc-type. One such clutch device of the electrically operated type is shown in FIGS. 1–4 as comprising an inner sleeve 26 fixed relative to shaft extension 12 for rotation therewith by means of a key 28. An annular clutch coil generally indicated by the reference numeral 30 is spaced from sleeve 26 by means of annular ball bearing assemblies 31. A plurality of inner and outer annular friction discs 32 and 34 are positioned between a movable pressure plate 36 and a buttress plate 38, the latter being fixed against axial movement relative to bearing assemblies 31 and clutch coil 30 by means of ring 40. The outer friction discs 34 are each provided with a series of notches 42 (see FIG. 4) which cooperate with rigid parallel fingers 44 extending away from sprocket 24. By the same token, the inner friction discs 32 are provided with similar notches 46 which are adapted to engage teeth 48 extending radially from the outer surface of inner sleeve 26.

During operation, clutch coil 30 is supported on the outer non-rotating raceways of antifriction bearings 31. As sprocket 24 is driven by chain 25, the outer friction discs 34 will also be driven in the same direction by virtue of their engagement through notches 42 with the rigid fingers 44 extending away from the sprocket. When the clutch is disengaged, the outer friction discs 44 are held in spaced relationship from the inner friction discs 32 by means of small separator springs 54. By maintaining a spaced relationship between the inner and outer friction discs, inner sleeve 26 and the shaft 12 keyed thereto will remain stationary while sprocket wheel 24 continues to turn. To engage the clutch, coil 30 is energized by current flowing through leads 37a and 37b, causing pressure plate 36 to move axially towards buttress plate 38 under the influence of the resulting flow of magnetic flux which is indicated diagrammatically in FIG. 3 by arrows 52. This in turn will result in the separator springs being compressed as the inner and outer friction discs are brought into face-to-face contact. Since the inner friction discs 32 are mechanically connected to inner sleeve 26 by virtue of the cooperative relationship between notches 46 and teeth 48, energization of clutch coil 30 establishes a driving relationship between sprocket 24 and shaft 12.

Moreover, it should also be noted that the torque capable of being developed by clutch 22 will be directly proportional to the force with which the inner and outer friction discs 32 and 34 are held together. This force will in turn be controlled by regulating the current passing through coil 30. Thus, with this arrangement, the clutch can be adjusted to slip upon attainment of any predetermined torque within prescribed design limits by simply controlling current flow through coil 30.

The means utilized to control the operation of clutch 22 will now be described with particular reference to FIG. 5 wherein the control circuit is shown comprised of a transistorized sensitive relay 54 such as for example that sold by General Electric Company under the model designation CR120F. As will hereinafter be discussed in greater detail, relays of this type are preferable because they operate on relatively low voltage. The input terminals 56 and 58 of relay 54 are connected respectively to feed roll 10a by means of a brush contact 60 and to ground as at 62a. When a connection is provided between terminal 56 and ground, the relay coil 64 is energized to close normally open switch 66 and to open normally closed switch 68.

Under normal operating conditions, current is fed from a D.C. power supply 70 through a circuit including variable resistor 72, lead 37a, clutch coil 30, lead 37b and normally closed switch 68. With this arrangement, the amount of current flowing through clutch coil 30 may be manually adjusted by simply regulating resistor 72, thus enabling operating personnel to adjust the maximum torque level attainable with clutch 22 before the inner and outer friction discs 32 and 34 begin to slip. In practice, this maximum torque level will be set slightly above that normally required to pass the fibers between feed rolls 10a and 10b, yet below that at which the teeth on the feed rolls will begin to distort and be damaged should a relatively hard bulky piece of non-conductive foreign material be presented to the feed rolls. In this manner, an automatic safeguard is provided against inadvertent damage to the feed rolls. This safeguard is effective without constant attention on the part of operating personnel and without the necessity of shutting down the entire carding machine when stoppage of the feed rolls is required to remove the impediment.

On occasion, foreign materials such as relatively small metallic objects may also be presented to the feed rolls along with the supply of cloth fibers. These metallic objects may be small enough to pass through the feed rolls without increasing the torque being developed by clutch 22. Where this is the case, and without additional safeguards, metallic objects might conceivably be introduced into the carding machine to cause trouble at some subsequent stage in the carding operation. To prevent this occurrence, feed roll 10a is connected by means of brush contact 60 to the input terminal 56 of transistorized sensitive relay 54. As previously indicated, feed roll 10a is electrically insulated from the carding machine frame and from feed roll 10b by means of insulated bearing 14 and dielectric gearing 20. However, as indicated diagrammatically in FIG. 5, feed roll 10b is grounded to the carding machine frame as at 62b through conventional bearings 14. Thus, should a metallic object bridge the gap between the teeth on the feed rolls as suggested at M in FIGS. 1 and 5, a circuit will be established effectively grounding input terminal 56. When this occurs, relay coil 64 will be energized. This in turn will cause normally open switch 66 to be closed and normally closed switch 68 to be opened. As soon as switch 68 is opened, clutch coil 30 is de-energized and clutch 22 effectively disengaged. In addition, the closing of switch 66 results in the input terminal 56 of transistorized sensitive relay 54 again being grounded as at 62c through a circuit which includes a normally closed "ON" switch 74. This latter action establishes a holding circuit which insures permanent grounding of terminal 56 and disengagement of clutch 22 until the metallic object M is removed from between the feed rolls 10a and 10b and until the "ON" switch 74 is pushed by operating personnel to momentarily interrupt the connection between input terminal 56 and ground 62c. This de-energizes coil 64 causing switch 66 to open and switch 68 to close. In this manner, even a momentary grounding of input terminal 56 by a piece of metallic foreign material M will insure stoppage of the feed rolls 10a and 10b until the metallic object is retrieved. In addition, operating personnel will be able to retrieve a metallic object without fear of the work rolls beginning to rotate until "ON" switch 74 is manually and temporarily depressed.

Under normal operating conditions, it may at times be desirable to disengage clutch 22 for purposes other than for the clearing and retrieval of foreign material. For this reason, a second "OFF" switch 76 is provided adjacent the normally closed "ON" switch 74. Depressing switch 76 will result in input terminal 56 being grounded as at 62d to activate coil 64 to establish the holding circuit to ground 62c in much the same manner as previously described in connection with the arrival of a piece of metallic foreign material between the feed rolls. In this manner, operating personnel are always provided with a quick and efficient means of stopping feed roll rotation by simply depressing one button 76 to disengage clutch 22. Stated in the alternative, momentary grounding of input terminal 56 either at 62b by a metallic piece of foreign material M bridging the gap between feed rolls 10a and 10b or at 62d by depression of "OFF" button 76 will de-energize clutch coil 30. In addition, a holding circuit will be established grounding terminal 56 at 62c until such time as "ON" button 74 is depressed.

Other types of disc clutch devices may be utilized in much the same manner as the electrically actuated clutch 22 shown in FIGS. 1–4. For example, a pneumatically operated clutch of the type shown in FIG. 6 and generally indicated by the reference numeral 78 might be employed in a slightly different manner to achieve the same results. More particularly, clutch 78 is shown comprising an inner sleeve 80 fixed relative to shaft 12 for rotation therewith by means of a key 82. Sleeve 80 is provided adjacent one end with a series of teeth 84 which teeth engage suitable disposed notches on inner friction discs indicated typically by the reference numeral 86. The inner friction discs are spaced by outer friction discs 88, the latter being provided with peripheral notches into which are seated rigid parallel fingers 90 extending away from an annular plate 92 fixed to sprocket wheel 24 by means of screws 94. The inner and outer friction discs 86 and 88 are positioned between a buttress plate 95 which is held against movement to the right as viewed in FIG. 6 relative to sleeve 80 by means of a ring 96, and an axially movable pressure plate 98 on which is mounted an annular roller bearing assembly 100. A somewhat ring-shaped piston 102 is slidably mounted within an annular cylinder 104, the former being attached to the outer non-rotating raceway 100a of bearing assembly 100, and the latter being spaced from inner sleeve 80 by a second bearing assembly 106.

An air line 108 which may include a manually adjustable reducing valve 110, gauge 112 and valve 114 actuated by solenoid 115 is connected to cylinder 104 as at 116. When compressed air is introduced through passageway 118 against the rear of piston 102, the combination of piston 102, bearing assembly 100 and pressure plate 98 is advanced in an axial direction towards buttress plate 95. This action forces the inner and outer friction discs 86 and 88 together and engages the clutch in much the same manner as previously described in connection with the electrically operated disc-type clutch 22 shown in FIGS. 1–5.

In view of the above, it should now be apparent to one skilled in the art that by manually adjusting reducing valve 110 through manipulation of handle 120, the air pressure being exerted on piston 102 can be varied to control the torque level at which clutch 78 will begin to slip. This is, of course, comparable to the result obtained from manually adjusting variable resistor 72 in FIG. 5. Moreover, clutch 78 may be engaged and disengaged by either energization or de-energization of solenoid actuated valve 114. Again, this action is comparable to that obtained by controlling the operation of switch 68 in FIG. 5. In the circuitry of FIG. 5, valve 110 may take the place of resistor 72 and solenoid 115 would take the place of clutch coil 30.

A further modification is shown in FIGS. 7 and 8. The improvement herein is that complete disengagement of the clutch 22 occurs whether the foreign material between the feed rolls is conductive as indicated at CM or non-conductive as indicated at NC.

The roll construction in FIG. 7 is the same as that shown in FIG. 1 and the parts have been correspondingly numbered.

When a metallic particle CM comes between the rolls 10a and 10b, a grounding circuit the same as that shown in FIG. 5 will be established, namely from ground 62b, wire 124, roll 10b, particle CM, roll 10a, brush 60 to terminal 56. This circuit de-energizes clutch coil 30 and opens clutch 22 to stop instantly rolls 10a and 10b.

When a non-metallic or non-conductive particle NC comes between rolls 10a and 10b, alternative circuitry is provided for de-energizing coil 30. The mechanism to produce this result operates as follows.

The shaft 12 extends to the right beyond sprocket 24 as at 12a. A spacing collar 126 is mounted on shaft extension 12a against the sprocket 24. A second collar 128 of electrical insulating material is fixed to shaft 12a by set screw 130. Collar 128 has a band 132 of conducting material extending thereabout and out of electrical connection with shaft 12a. A pin 134 holds band 132 securely in place on collar 128. Band 132 has a radially extending metal finger 136 to which is attached a contact 138.

Mounted on the outer face of sprocket 24 is a pin 140 of such length that when angularly aligned with contact 138, its knife-like end will engage the contact thus making an electrical circuit from shaft 12 through sprocket 24, pin 140, contact 138, finger 136 to band 132.

Also in continuous sliding engagement with the face of band 132 is a fixed brush 142 having a lead 144 running to terminal 56.

In normal operation, the collar will be set on shaft end 12a in a position in which contact 138 will be a few angular degrees ahead of pin 140 as shown in FIG. 8. In this position, the pin remains out of engagement with contact 138 as the fibers normally are passing between rolls 10a and 10b. When a particle NC stops rotation of the rolls, there is almost instantaneous engagement of pin 140 with contact 138 which can occur because of the slippage in clutch 22 permitted by proper adjustment of resistor 72.

On the making of this contact, a circuit is established from ground 62b, wire 124, shaft 12, sprocket 24, pin 140, contact 138, band 132, brush 142 and wire 144 to terminal 56. This circuit actuates solenoid 64 and in turn clutch coil 30 and clutch 22 in the manner previously explained in reference to FIG. 5.

The construction in FIG. 7 just explained acts to cause immediate disengagement of clutch 22 when a nonmetallic particle stops the rolls, as distinguished from the continuously slipping clutch arrangement in FIG. 1 brought about by a non-conductive particle stopping roll rotation.

Having thus described the invention, its operational advantages will now be reviewed with reference to all of the drawings. To begin with, it should be noted that a dual system is provided for protecting the feed rolls against damage from foreign material which may or may not be electrically conductive. For example, referring to FIGS. 4 and 7, it can be seen that if the gap between feed rolls 10a and 10b is bridged by an electrically conductive piece of foreign material, normally closed switch 68 will immediately be opened, thus interrupting the flow of current through clutch coil 30 and causing the clutch 22 to be disengaged. As previously discussed, the clutch will thereafter remain disengaged until "ON" button 74 is depressed. This of course obviates any possibility of operating personnel being injured while they are in the process of retrieving the electrically conductive foreign material.

Use of a transistorized sensitive relay 54 is also advantageous in that such relays operate on relatively low current. Thus, should the gap between feed rolls 10a and 10b be bridged by a piece of conductive foreign material, sparking will be avoided and a fire hazard eliminated.

In addition to the above, means are also provided for protecting the feed rolls against damage caused by contact with hard bulky pieces of non-conductive foreign material. This is accomplished with electrically actuated disc-type clutches by simply adjusting the variable resistors 72 (see FIG. 5) to control the flux forcing the inner and outer friction discs 32 and 34 in clutch 22 together. As previously mentioned, when properly adjusted, the clutch discs will cooperate to permit development of a torque slightly above that required to pass fibers between the feed rolls, yet below that sufficient to distort the teeth or wires on the feed rolls should a bulky piece of foreign material be contacted. Thus, with this arrangement in FIG. 1, as soon as a piece of foreign material becomes lodged between the feed rolls, clutch 22 will begin to slip. The same results are of course obtainable through use of a pneumatically operated disc-type clutch such as that disclosed in FIG. 6.

Alternatively, when the construction of FIGS. 7 and 8 is used, the slipping of the clutch is momentary only until contact is made between contact 138 and pin 140 which sets up the circuit to open clutch 22, the same as occurs when an electrically conductive particle of foreign material comes between the rolls.

It is intended to cover all changes and modifications of the examples of the invention herein chosen for purposes of the disclosure which do not constitute departures from the spirit and scope of the invention.

We claim:

1. In a carding machine, parallel feed rolls shafts of which are mounted in bearings in fixed spaced relation, said rolls having surface teeth in electrical connection with respective shafts, the bearings of one shaft being of insulating material whereby said one shaft is electrically insulated from said machine, a gear normally rotating continuously and connected by an electrically operated clutch to the other shaft, meshing gears of insulating material on said shafts whereby said other shaft will drive said one shaft, an insulated collar fixed on said other shaft adjacent said gear, a band of conductive material on said collar, normally open means for making electrical connection between said band and gear upon small angular rotation of said gear with respect to said collar, said gear connected in driving relation with said other shaft by an electrically operated clutch of a type permitting slippage between said gear and other shaft when rotation of the latter is prevented by the presence of foreign matter between said feed rolls, a stationary brush in sliding engagement with said rotating band on said collar, a circuit from said brush including a relay which is actuated when said normally open means between said gear and band is closed upon small relative angular rotation of said gear with respect to said band upon stoppage of said other shaft, and an actuating circuit for said electrically operated clutch which circuit includes a normally closed switch, whereby said clutch is normally engaged during normal operation of said rolls, said relay when acuated arranged to open said switch to disengage said clutch.

2. The construction as set forth in claim 1 and a holding circuit established by said relay when actuated to maintain said switch open after the electrical connection between said gear and band has been opened by angular movement of said gear with respect to said band.

3. The construction as set forth in claim 2 and a normally closed switch in said holding circuit manually operable to break said holding circuit and render said relay inoperative thereby to close the switch in said clutch actuating circuit to place said feed rolls again in operation.

References Cited

UNITED STATES PATENTS

| 2,102,906 | 12/1937 | Merchant | 19—22 |
| 2,936,054 | 5/1960 | Simon et al. | 192—84 |
| 3,092,875 | 6/1963 | McLean | 19—.23 |
| 3,204,054 | 8/1965 | Ouellette | 200—61.09 |
| 3,283,865 | 11/1966 | Mason | 192—84 |
| 3,345,694 | 10/1967 | Pittman | 19—.2 |

DORSEY NEWTON, Primary Examiner

U.S. Cl. X.R.

19—105